United States Patent [19]
Hughes

[11] Patent Number: 6,095,100
[45] Date of Patent: *Aug. 1, 2000

[54] COMBINATION INTERNAL COMBUSTION AND STEAM ENGINE

[76] Inventor: Barry Frank Hughes, 56 Hoffschildt Drive, Currumbin Waters, Queensland 4223, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 09/066,419

[22] PCT Filed: Nov. 1, 1996

[86] PCT No.: PCT/AU96/00695

§ 371 Date: Apr. 30, 1998

§ 102(e) Date: Apr. 30, 1998

[87] PCT Pub. No.: WO97/16634

PCT Pub. Date: May 9, 1997

[30] Foreign Application Priority Data

Nov. 1, 1995 [AU] Australia ............................... 34575/95

[51] Int. Cl.[7] .............................. F02B 47/02; F02G 3/00
[52] U.S. Cl. ............................ 123/25 C; 60/620; 60/622
[58] Field of Search ............................. 60/620, 622, 621, 60/623; 123/25 C, 25 R

[56] References Cited

U.S. PATENT DOCUMENTS

| | | | |
|---|---|---|---|
| 892,790 | 7/1908 | Williams . | |
| 2,791,881 | 5/1957 | Denker | 60/15 |
| 3,918,263 | 11/1975 | Swingle | 60/614 |
| 4,976,226 | 12/1990 | Herman | 123/64 |
| 5,012,772 | 5/1991 | Nakamura | 123/25 C |

FOREIGN PATENT DOCUMENTS

| | | | |
|---|---|---|---|
| 453717 | 12/1949 | Italy | 123/79 C |
| 2 060 064 | 4/1981 | United Kingdom . | |

*Primary Examiner*—Henry C. Yuen
*Assistant Examiner*—Brian Hairston
*Attorney, Agent, or Firm*—Michaelson & Wallace; Peter L. Michaelson

[57] ABSTRACT

An engine (10) having a series of cylinders (12, 14, 16 and 18) in which pistons (30, 32, 34 and 36) are arranged for reciprocation and which are connected to a crankshaft (38). Two of the cylinders (12 and 18) operate in an Otto cycle, and water is injected through injectors (74) into the exhaust gases of those cylinders for conversion into steam which is directed to the other cylinders (14 and 16) for expansion to drive the pistons (32 and 34).

9 Claims, 4 Drawing Sheets

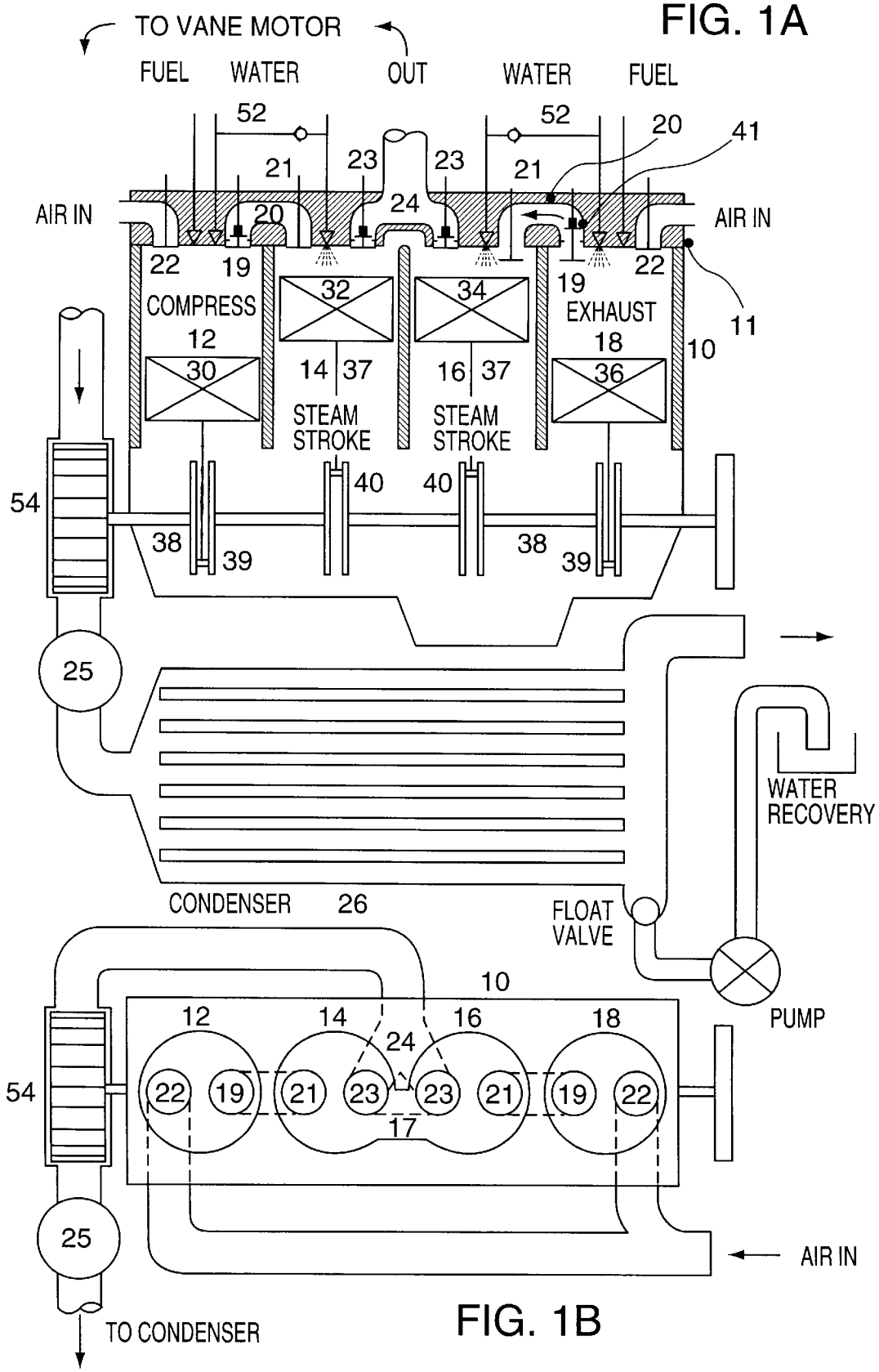

COMBINATION INTERNAL COMBUSTION AND STEAM ENGINE

BACKGROUND OF THE INVENTION

This invention relates to internal combustion engines.

Internal combustion engines which are most commonly in use, include a number of reciprocating pistons which operate in cylinders under an Otto cycle to draw in a charge of air or air/fuel mixture and compress same for ignition, either by means of an applied spark or by compression ignition. Whilst many other non-reciprocating engine designs have been developed or proposed, in general such alternate designs have not proved particularly advantageous over conventional reciprocating engines which remain in predominant use in the motor vehicle industry and other industries.

In current internal combustion engines, however, much of the heat energy is wasted, either by being exhausted to atmosphere, by radiating heat energy from the engine block or by transferring heat into the radiator cooling system.

SUMMARY OF THE INVENTION

The present invention aims to provide an alternate form of internal combustion engine which alleviates the abovementioned disadvantage of existing internal combustion engines.

In one aspect the present invention provides an engine assembly including:
  combustion chamber means in which, in use, a combustion process occurs effecting useful work in the form of output shaft power;
  expansion chamber means in which expanding gases may effect useful work in the form of output shaft power;
  inlet means to said expansion chamber means through which spent combustion gases from said combustion chamber means may be exhausted to said expansion chamber means, and
  mixing means for mixing a fluid, which changes to an compressed gas upon heating, with the exhaust gases introduced into said expansion chamber means.

The fluid may be introduced into the spent combustion gases either in the expansion chamber means or prior to entry into the expansion chamber means and is preferably introduced as a liquid and more preferably as water. The fluid may be simultaneously introduced into the exhaust gases in the combustion chamber means and the expansion chamber means where the expansion chamber means has a swept volume which is much greater than the swept volume of the combustion chamber means and suitably twice the swept volume of the combustion chamber means.

In a preferred embodiment the engine is adapted to operate at an elevated temperature above 250° C. and more preferably above 300° C. and liquid in the form of a coolant such as water is introduced into the combustion chamber means in order to cool the working parts in the combustion chamber means, such as the piston crown in the working chamber of a reciprocating engine.

It is also preferred that flow control means be provided to ensure that the expanding gas in the expansion chamber means does not flow back into the combustion chamber means. This is preferably achieved by forming the expansion chamber means with a greater swept volume than the swept volume of the combustion chamber means, or by or in addition, providing non-return valve means in the outlet from said combustion clamber means. The flow control means may include a control on the amount of said fluid introduced to the expansion chamber means.

The non-return valve may be of any suitable form such as a poppet valve, a barrel or sleeve valve or a flap valve, for example. It may be of the type which is operated by back pressure or it may be controlled by operating means operated in accordance with sensed or mechanical conditions in the engine or a combination of these methods. Preferably the non-return valve in an engine having poppet valves controlling the gas flows to and from the combustion chamber is a floating valve formed as a sliding collar about the stem of exhaust valve and associated with a seat opposing the exhaust valve seat.

The engine may be of any suitable form such as a rotary engine or a radial engine, however it is preferred that the engine be in the form of a four-cycle reciprocating engine having two cylinder assemblies arranged as independent combustion chambers and at least one further cylinder forming the expansion chamber adapted to alternately receive spent exhaust gases from the combustion chambers.

More suitably the engine is formed as an in-line multi cylinder engine wherein the end cylinder assemblies form the combustion chamber means and the inner cylinders form the expansion chamber means, whereby gas passage distances and, thus volumes of interconnecting passages between the end cylinders and inner cylinders may be minimized. In a preferred form the engine is a four-stroke/cycle four cylinder engine and suitably a diesel engine formed with the same or similar cylinder/piston stroke and bore dimensions and having the outer combustion cylinder assemblies operating 360° out of phase, that is one in the exhaust cycle and the other in the compression cycle and alternately exhausting to both inner cylinder assemblies for expansion therein, the inner cylinder assemblies being operatively interconnected for simultaneously receiving the exhausted gases.

It is further preferred that the injected liquid is condensed after it is exhausted from the expansion chamber means and collected for re-use such that the volume of liquid required for effecting operation-of the engine is reduced. In addition the gases exhausted from the expansion chamber means may be utilised to drive a turbocharger, turbine or vane motor.

In a further aspect the present invention provides a method for extracting energy from an internal combustion engine of the type having at least one cylinder; a piston arranged for reciprocation in said cylinder, and means for supplying a fuel to said cylinder for combustion in said cylinder for driving said piston, said method including:
  introducing water into the products of combustion for conversion to steam, and
  extracting available energy from the generated steam.

The available energy may be extracted in any suitable manner such as by driving a turbine or rotary vane motor or the like. The turbine or rotary vane motor may be separate from a conventional engine and fed with the engines exhaust gases and pulses of finely divided water injected upstream of the turbine or rotary vane motor. However it is preferred that the engine has at least one further cylinder having a piston arranged for reciprocation therein and the generated steam is directed to the further cylinder for expansion therein to drive the piston within the further cylinder.

BRIEF DESCRIPTION OF THE DRAWINGS

In order that this invention may be more readily understood and put into practical effect, reference will now be made to the accompanying drawings which illustrate preferred embodiments of the invention, and wherein:

FIG. 1 is a diagrammatic section of a preferred embodiment;

DESCRIPTION OF THE PREFERRED EMBODIMENT

Figure 2A:
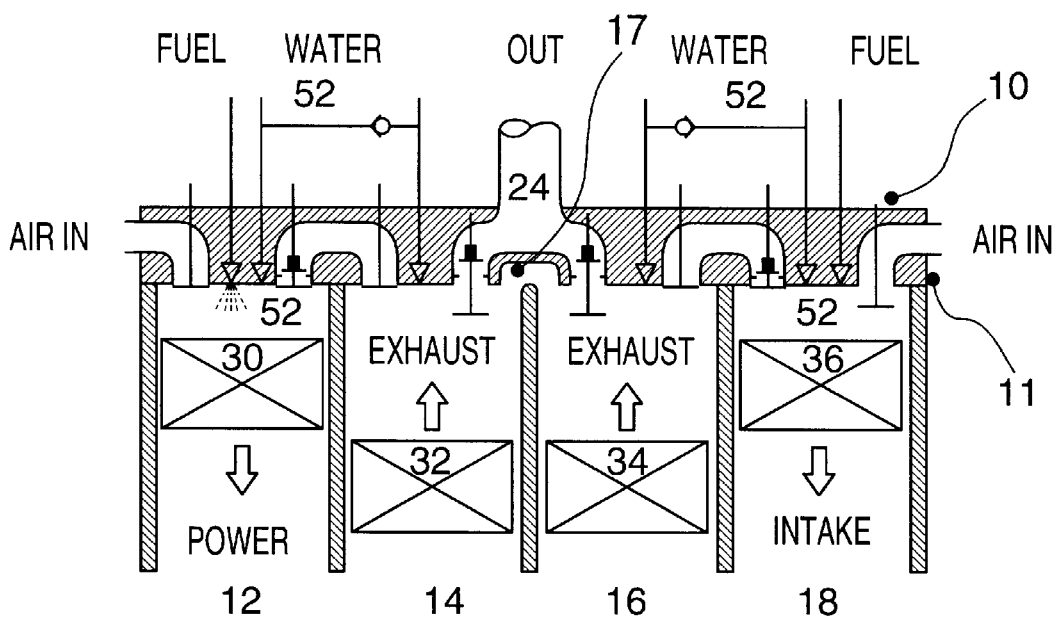
FIGS. 2A to 2D are enlarged diagrammatic views illustrating the top end of the engine of FIG. 1 during different engine cycles.
Figure 2B:
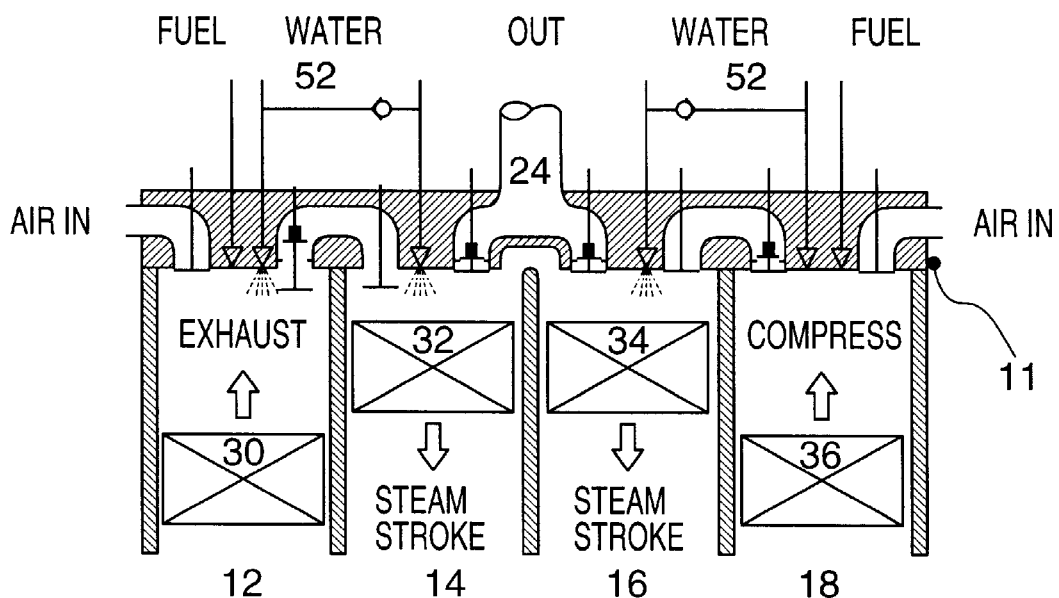
Figure 2C:
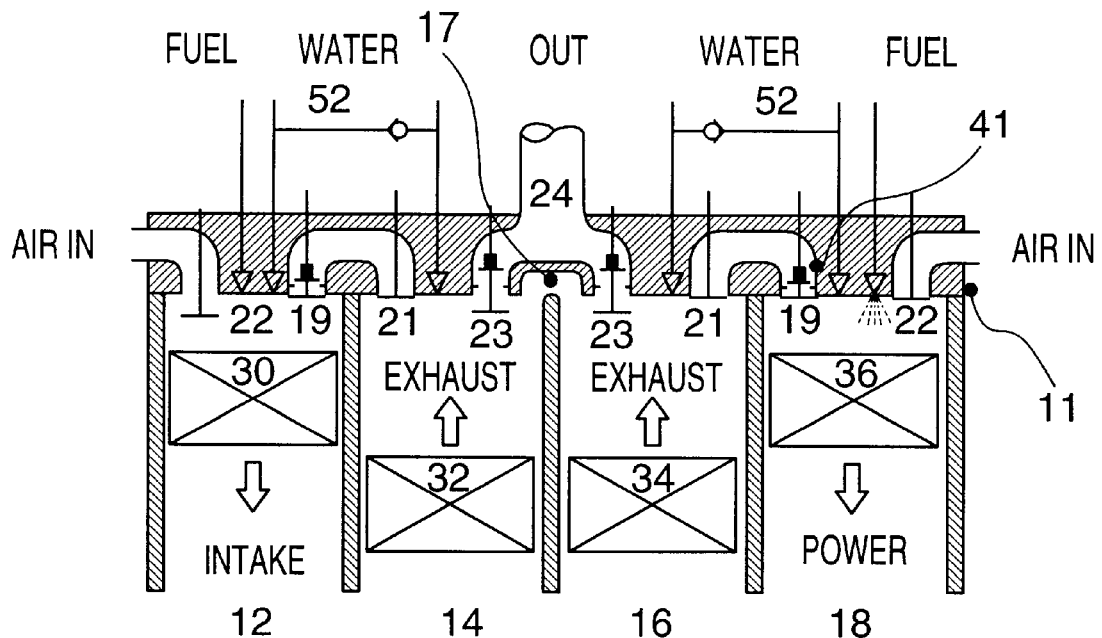
Figure 2D:
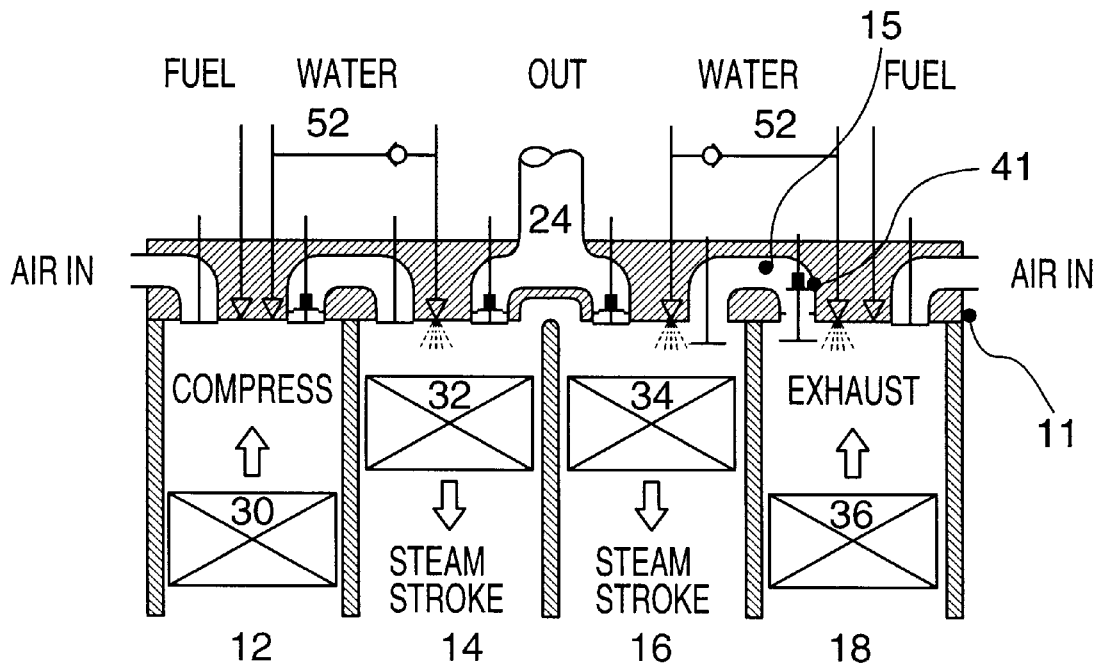
Figure 3:
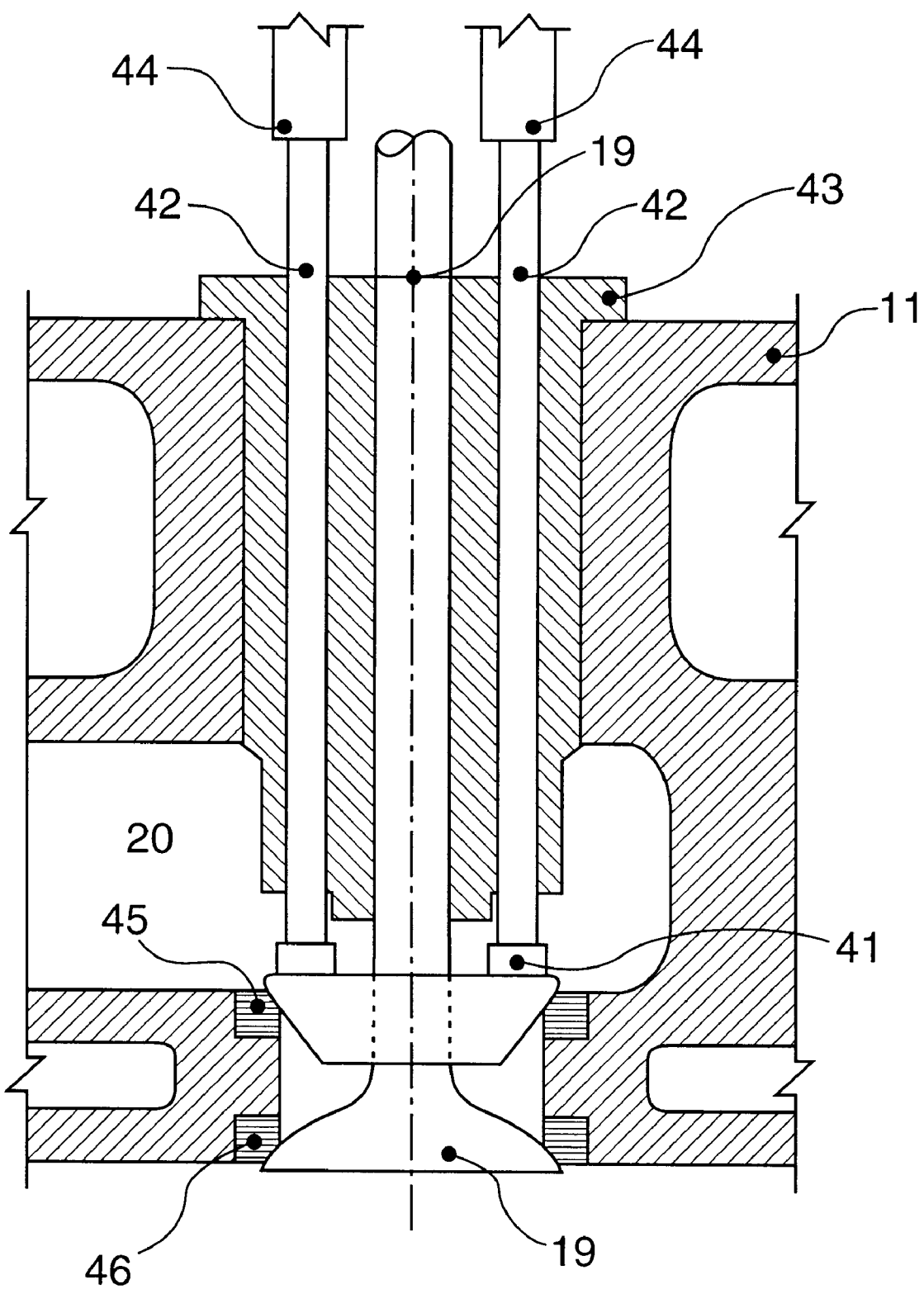
FIG. 3 illustrates a preferred form of non-return valve associated with the exhaust valve of the combustion chambers.

The engine embodiment 10 illustrated in FIGS. 1 to 3 is a straight four cylinder diesel powered engine which is mechanically similar to a conventional reciprocating engine except for the configuration of the cylinder head assembly 11 and camshaft (not shown, but which may be an overhead or in-block camshaft) so as to permit the cycles illustrated in FIGS. 2A, 2B, 2C and 2D to be performed.

The cylinder head assembly 11, as clearly illustrated in FIG. 2 maintains inlet and exhaust valves for each of the four cylinders 12, 14, 16 and 18 however the exhaust valves 19 of the outer cylinders 12 and 18 communicate with short passages 20 with the inlet valves 21 of the inner cylinders 14 and 16 while the inlet valves 22 of the outer cylinders 12 and 18 act in their conventional manner.

The outlet valves 23 of the inner cylinders 14 and 16 communicate with a common exhaust passage 24, which, as illustrated in FIG. 1, communicates with a turbocharger 25 and a condenser assembly 26 from which spent exhaust gases are discharged at low temperature and noise and from which used water is collected for re-use.

The pistons 30, 32, 34 and 36 are connected by con rods 37 to a crankshaft 38 which has the end crankpins 39 and the middle pair of crankpins 40 respectively aligned with each other.

The valve timing arrangement causes working four-cycle combustion processes to be performed in the outer cylinders 12 and 18 but 360° out of phase with one another and an expansion process to be performed in the inner cylinders 12 and 18 every revolution of the crankshaft. In addition the exhaust valves 19 communicate alternately, during respective expansion cycles, with both the inner cylinders 14 and 16 through respective inlet valves 21.

A check-valve assembly 41 as illustrated in FIG. 3 is associated with each exhaust valve 19. This check-valve assembly 41 serves to retain the pressure within cylinders 14 and 16 during the intake and compression strokes of cylinders 12 and 18.

Each check valve is opened by combustion cylinder pressure but only at a rate permitted by a pair of control rods 42 constrained for reciprocal movement through their support bearings 43 by the lobes 44 of a further camshaft (not illustrated). The opposite action of the rods 42 restores each check-valve to its seat 45, which opposes the exhaust valve seat 46, and where it is held by back pressure until the next cycle. The control rods can be inclined so as to avoid the valve gear.

The camshaft lobes of a conventional camshaft (not shown) are configured to allow the changed valving arrangements, and the original diesel injector pump is adapted with two additional cam-lobes for the injection of water into the exhaust gases from the combustion process for conversion to steam. In this embodiment the water is injected through either of two sets of three water inlets 52 during each revolution of the engine crankshaft. A further two cylinder diesel injector pump is added to the camshaft power take-off for supplying diesel to the end combustion cylinders 12 and 18.

In order to make use of as much of the heat energy generated in the combustion process in cylinders 12 and 18, which is presently wasted in current four-stroke Otto Cycle engines, the hot exhaust gases generated in the combustion chambers 12 and 18 are utilised to heat injected water for the production of steam which is expanded through the expansion cylinders in order to produce more power at the crankshaft than is supplied only from the combustion process.

In operation, cylinder 12, a conventionally working Otto Cycle engine chamber, draws in its intake charge through valve 22 while cylinder 18, also a conventionally working chamber is undergoing its power downstroke. After the product of combustion have performed their useful work in the combustion cylinders 12 and 18, instead of releasing the hot pressurised gas to atmosphere, these gases are partly quenched, as the exhaust valve is opening, by the simultaneous injection of a mist of water into cylinder 12, timed near bottom dead center of the piston 30 therein, and cylinder 14 and 16, timed near top dead center of the pistons 32 and 34 therein.

These mists of finely divided water should instantly flash to dry super heated steam. The steam pressure will be determined by the amount of water injected. Cylinder 12 alternates with cylinder 18 in supplying exhaust gases to cylinders 14 and 16 so that cylinders 14 and 16, which are always inter-connected with each other, produce a steam powered downstroke at every revolution of the crankshaft 38.

The combined displacement of cylinders 14 and 16, being twice that of each combustion cylinder 12 or 18, ensures that the positive driving force transmitted to the crankshaft 38 through pistons 32 and 34 is greater than the retarding force acting against the advancing combustion chamber piston 30 or 36. Thus a nett additional driving force is obtained.

Furthermore the amount of heat energy available at either combustion cylinder 12 or 18 near bottom dead centre can be considerably more than in current engines as it is proposed to use high temperature oil in the engine block cooling circuit which is held at around 320° C. This allows a lesser quantity of heat to be lost into the cooling circuit because of lesser temperature difference.

Thus a much smaller radiator may be employed because only half the fuel, supplied to two only of the four cylinders, is burnt and during the power stroke, less heat than usual is lost into the block due to the lesser temperature difference between block and combustion gases.

During the exhaust stroke the partly quenched gases, due to lesser temperature difference, will lose less heat into the block which briefly gives a small but useful amount of heat to the intake air. Also due to a great temperature difference, the radiator gives a greater amount of heat to the cooling air.

In addition a smaller heat rejection requirement permits a saving in power needed to drive the cooling circuit fan. This may also contribute to the overall thermodynamic efficiency of the engine 10. There is also a lack of compression loads in cylinders 14 and 16 which, while contributing toward overall thermodynamic efficiency, provide for easier cranking during start-up and thus lighter starting mechanisms. It is also proposed to insulate much of the body of the engine 10 so as to minimise unintentional heat loses.

An Engine management system will control the 'start-up', fuel and water settings to suit power requirements and 'shut-down' sequence. After start-up, the engine management system causes the engine to run briefly without water injection in order to establish a reasonable operating temperature. This also serves to bring the turbo-charger 25 up to speed. Shut-down commences with isolating the water injection circuit, then idling until the turbo-charger has slowed sufficiently, then cut-off at the rack or ignition in the case of a petrol engine.

Cylinder pair 14 and 16 may exhaust their products to an optional vane motor 54 attached to the crankshaft 38. The displacement of this vane motor is several times that of the combined displacement of cylinders 14 and 16. The steam begins to condense in the vane motor as heat is converted into motive power. The gases then pass through the turbo charger 25, where some useful work is performed, and further condensation takes place. The gases then make several passes through an air-cooled condenser 26 which traps the water for return to tank and re-use.

The alternate communication of the combustion chambers 12 and 18 with the expansion chambers is clearly illustrated in FIGS. 2A to 2D. In 2D, the cylinder 18 is at the commencement of the exhaust stroke and its exhaust valve is open to permit exhaust gases and steam to communicate with the expansion chambers 14 and 16 through the passage 15, these cylinders being bridged for communication with one another at 17. The force applied by the high pressure steam and exhaust gases on the downgoing pistons 32 and 34 is greater than that applied to the upcoming piston 36. Thus useful work is transmitted to the crankshaft 38. After a further 360° rotation of the crankshaft the cylinder 30 exhausts in the same manner. The four cycles of intake, compression, power and exhaust are illustrated for the cylinder 18 in FIGS. 1A to 1D. It will thus be readily seen that the cylinders 12 and 18 operate as conventional four stroke engines and complete their cycle every two revolutions of the crankshaft 38 while the expansion pistons operate as expansion and exhaust cycles at every revolution of the crankshaft 38.

In a diesel application a centrifugal device separates particles of soot caught and held by the condensing water, this minimising the clouds of black sooty smoke emitted during increasing power demands. No muffler is needed because of the quietness of any release of combustion products.

It should be understood that while a conventional overhead valve engine is illustrated, side valving may be utilised without the significant disadvantages generally associated with this form of engine.

If desired, final expansion and consequential cooling may occur in a further larger cylinder assembly in an inverse adiabatic process. Dry super-heated steam from the expansion cylinders becomes saturated steam and provides work on the piston of the larger cylinder assembly in the same manner as a steam locomotive cylinder.

The engine management system may be adapted to closely monitor temperatures within cylinder chambers and manifolds, and accordingly adjust fuel and water injection rates along with fan cooling of the final phase to ensure optimum engine efficiency.

Whilst various embodiments of the engine have been described, it will be apparent that the engine may adopt many different configurations in which injection of water into a cylinder will be transformed into steam or super-heated steam on hitting the hot exhaust gas, the resultant expansion of steam being used to extract further energy from the engine.

It is to be understood that the above has been given by way of illustrative embodiment of the invention, all such modifications and variations thereto as would be apparent to persons skilled in the art are deemed to fall within the broad scope and ambit of the invention as is defined in the appended claims.

The claims defining the invention are as follows:

1. A compound internal combustion engine assembly comprising:

a first combustion chamber;

a second combustion chamber;

a steam chamber having a work-output device mounted for movement therein;

a first passageway extending between said first combustion chamber and said steam chamber;

a second passageway extending between said second combustion chamber and said steam chamber;

means for operating said first and second combustion chambers in a 360 degree out-of-phase, four-stroke combustion cycle;

valve means for opening said first passageway during an exhaust stroke of said first combustion chamber, opening said second passageway during an exhaust stroke of said second combustion chamber, and closing said first and second passageways during all other strokes of respective ones of said first and second combustion chambers; and water injection means for injecting water into hot exhaust gases in said first and second combustion chambers during respective openings of said first and second passageways to create pressurized, super-heated steam in said steam chamber and initiate a steam work-expansion process in which said pressurized, super-heated steam performs work on said work-output devices as said pressurized, super-heated steam expands in said steam chamber, whereby one of said steam work-expansion processes occurs for each combustion cycle of said first and second combustion chambers.

2. The engine assembly of claim 1, wherein said valve means includes poppet valves mounted to control gas flow through said first and second passageways.

3. The engine assembly of claim 1, wherein said first combustion chamber, said second combustion chamber, and said steam chamber each have an operative volume, and wherein the operative volume of said steam chamber is at least twice as great as the operative volume of each said first and second combustion chamber.

4. The engine assembly of claim 1, wherein said steam chamber is partitioned into two chamber sections in communication with each other.

5. The engine assembly of claim 4, wherein said two chamber sections each include a steam cylinder and said work-output device includes two reciprocating pistons each mounted in a different one of said steam cylinders, said first and second combustion chambers each include a cylinder and a reciprocating piston such that said engine assembly functions as a four-cylinder, reciprocating-piston engine, and said steam cylinders mount adjacent each other.

6. The engine assembly of claim 5, wherein said two chamber sections, and said first and second combustion chambers mount as an in-line four-cylinder engine with said first and second combustion chambers mounted at opposite ends of said in-line four-cylinder engine, and with said two chamber sections mounted between said first and second combustion chambers.

7. The engine assembly of claim 6, further including a condenser means coupled to said steam chamber for condensing gases discharging from said steam chamber, and a water recovery device connected to said condenser means.

8. The engine assembly of claim 1, wherein said engine assembly includes means for operating said engine assembly above 250 degrees centigrade.

9. The engine assembly of claim 8, wherein said water means includes water-insertion means for inserting water into said first and second combustion chambers at the commencement of their respective exhaust cycles, and into said expansion chamber at the commencement of each said steam work-expansion process.

* * * * *